W. G. LIESER.
WHIP LOCK.
APPLICATION FILED MAY 4, 1908.
911,309.
Patented Feb. 2, 1909.
2 SHEETS—SHEET 2.
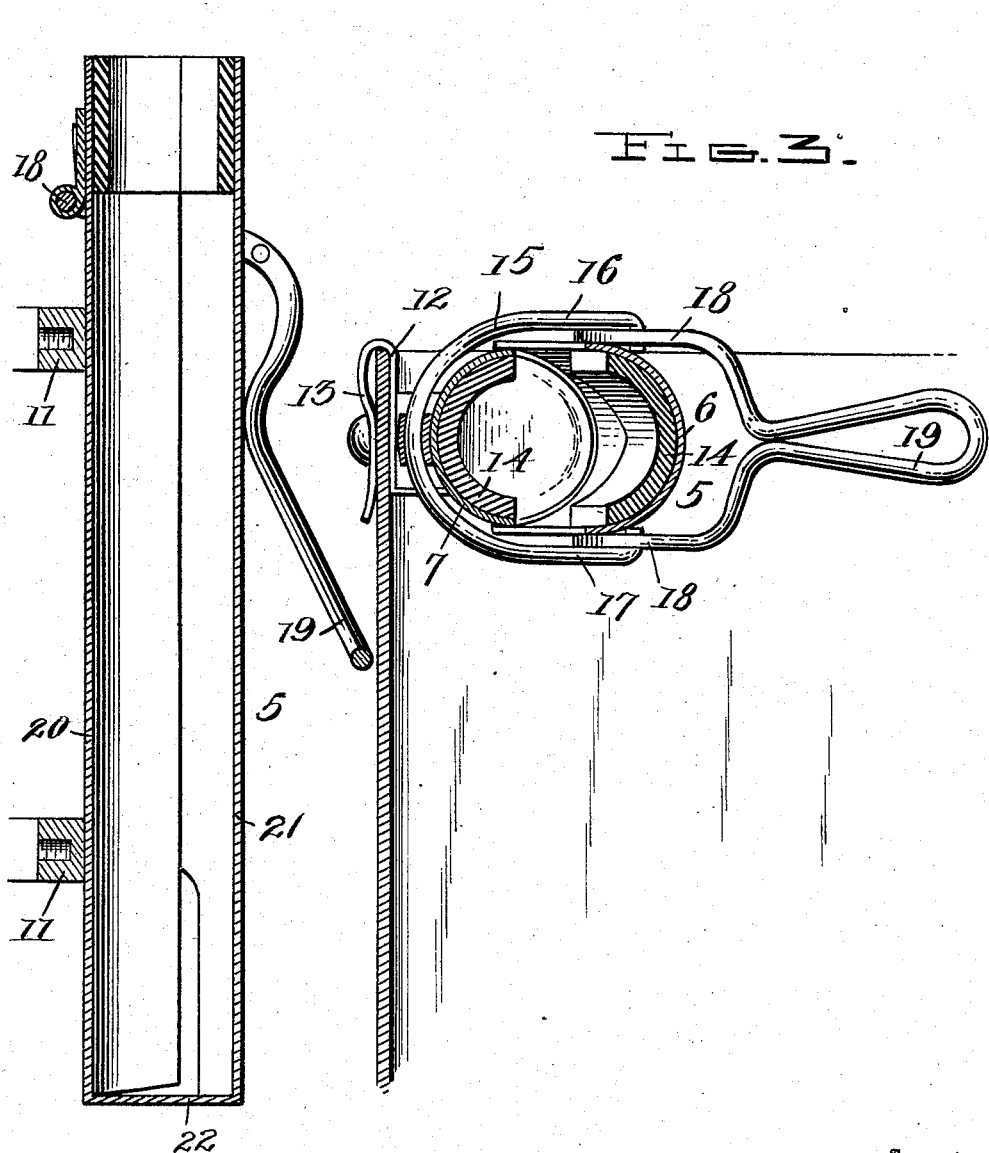
Witnesses
Inventor
W. G. Lieser.
By Woodward & Chandlee
Attorneys

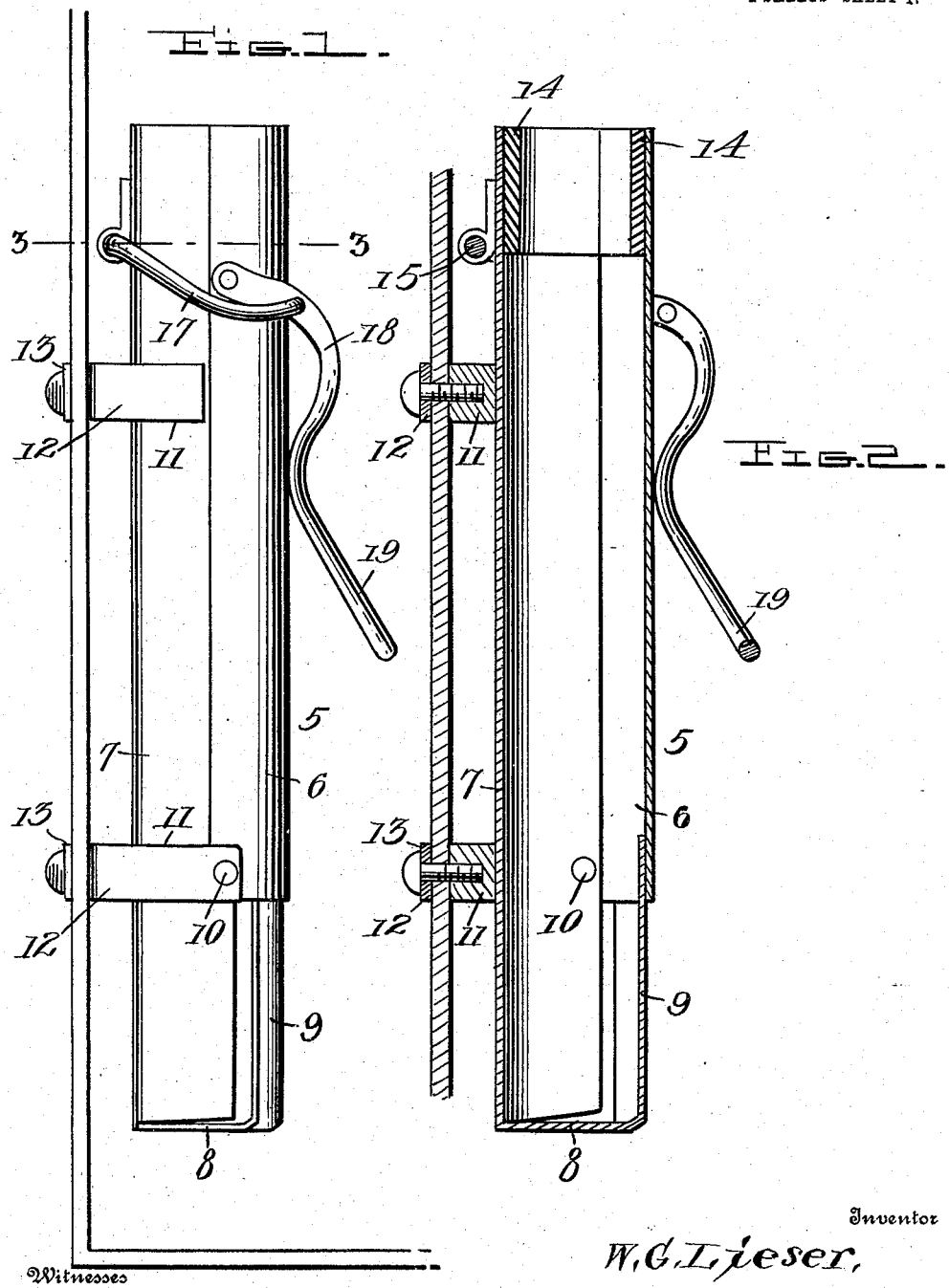

UNITED STATES PATENT OFFICE.

WILLIAM G. LIESER, OF BOLIVAR, OHIO.

WHIP-LOCK.

No. 911,309.        Specification of Letters Patent.        Patented Feb. 2, 1909.

Application filed May 4, 1908. Serial No. 430,720.

*To all whom it may concern:*

Be it known that I, WILLIAM G. LIESER, a citizen of the United States, residing at Bolivar, in the county of Tuscarawas and State of Ohio, have invented certain new and useful Improvements in Whip-Locks, of which the following is a specification.

This invention relates to the class of carriages and wagons, and more particularly to whip locks, and has for an object to provide a device of this character which may be formed from a single piece of sheet material, which may be conveniently and effectively applied to the dash board or other part of a vehicle and which will serve to hold and lock the whip against displacement or loss when the vehicle is traveling.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevational view of the present invention, showing the same applied to the dash board of a vehicle, Fig. 2 is a longitudinal sectional view, Fig. 3 is a transverse sectional view on the line 3—3 of Fig. 1, the socket being in an open position, Fig. 4 is a view similar to Fig. 2 showing a slightly modified form of my invention.

Referring now more particularly to the drawings, there is shown a whip socket 5 comprising two semi-cylindrical and vertically disposed members 6 and 7 respectively. The member 6 is somewhat shorter than the member 7 and lies with its lower end in spaced relation to the lower end of the member 7. The member 7 at its lower end is bent at right angles as shown at 8 to serve as a bottom for the socket as will be readily understood. The bottom 8 is provided with a vertically disposed portion 9 arranged to bear at its upper end against the member 6 upon the inside thereof.

The member 6 adjacent to its lower end has each side pivoted as shown at 10 to each side of the member 7 whereby said member 6 is arranged for movement of its upper portion toward and away from the member 7 for a purpose to be hereinafter referred to.

The member 7 is provided with spaced lugs 11, and secured to these lugs there are shown straps 12 having spring clamping members 13. Each member, at its upper end, and upon its inner side is provided with small cushions 14, preferably of rubber, felt or the like and thus serves to frictionally bind against a whip as is obvious.

The member 7 is provided with a pivotally mounted member 15 having outwardly directed arms 16 and 17 respectively which are pivotally connected to arms 18, which are pivotally connected to the member 6, and which are carried by an operating lever 19. It will thus be seen that the arms 16 and 17 are eccentrically connected to the arms of the just described lever, and it is obvious that upon movement of the lever in an upward direction the members 6 and 7 respectively of the socket will be separated or moved away from each other whereby a whip may be conveniently removed. After a whip is inserted within the socket the lever may be depressed, whereby the two members 6 and 7 respectively will securely engage the stock of the whip as will be readily understood. The portion 9 of the member 7 thus serves as a spring to bear upon the inner side of the member 6 to assist in opening the members when the lever is moved in an upward direction.

In the modified form of my invention shown in Fig. 4, the socket is formed of a single piece of material bent to form members 20 and 21 respectively having a connecting portion 22, at the bottom, as shown. The remaining portion of this modified form is identical with that previously described. In this form of my invention it will be apparent that the two members of the socket need not be pivotally connected as described in the preferred form of my invention as the formation of these two members is such that the bottom portion serves the same function as the pivot in the preferred form.

What is claimed is:

1. A whip socket comprising two hingedly connected members, vehicle engaging clamps carried by one of said members, a pivotally connected member carried by one of said first named members, and a lever pivotally connected with the other of said first named members arranged for operation whereby one of said members may be moved toward or away from the other of said members.

2. A whip socket comprising two hingedly connected semi-cylindrical members, vehicle clamping means carried by one of said members, elastic cushions carried by said members, a member pivotally connected to one of said members and including spaced arms arranged at each side of said members, and a pivotally mounted lever carried by the other of said members and eccentrically connected with said arms.

In testimony whereof I affix my signature, in presence of two witnesses.

WILLIAM G. LIESER.

Witnesses:
 HOMER E. BLACK,
 WM. R. BLACK.